Patented May 24, 1949

2,470,808

UNITED STATES PATENT OFFICE 2,470,808

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 12, 1947, Serial No. 734,213

5 Claims. (Cl. 252—340)

This invention relates to the resolution of petroleum emulsions.

The main object of our invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another objection of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification as contemplated in the present application, includes the preventive step of commingling the demulsifier with the aqueous component which would or might subsequently become either phase of the emulsion in absence of such precautionary measure. Similarly, such demulsifier may be mixed with the hydrocarbon component.

The herein described new chemical products, compounds, or compositions of matter which are used as the demulsifying agent in our process, are the resultants of drastic oxidation of certain modified glycerides or the corresponding acid. These modified glycerides or acids are obtained by partial hydroxylation of polyene acid glycerides or acids by means of hydrogen peroxide. Reference to partial hydroxylation is intended to point out with particularity that the hydroxylation is intended to reduce or eliminate the unsaturation only partially by replacement of such unsaturated radicals with hydroxyl radicals. Stated another way the modified glycerides or acids contain both ethylene radicals and hydroxyl groups, and to such an extent are somewhat comparable to castor oil or ricinoleic acid.

Reference is made to U. S. Patent 2,307,494 dated January 5, 1943, to De Groote and Keiser. This particular patent describes among other things a demulsifying agent obtained by the oxyalkylation of drastically oxidized castor oil.

Compounds or mixtures of compounds obtained by hydroxylation, followed by oxidation and subsequently by oxyalkylation of the polyene acid glycerides, or acids, such as sardine oil, linseed oil, or the like, bear some relationship to castor oil in certain respects, but are markedly different in other respects. One reason for this difference may reside in the fact that the hydroxyl groups in the herein contemplated products or intermediates prior to drastic oxidation, appear in pairs as adjacent (vicinal) hydroxyl radicals.

Attention is directed to the article entitled "Hydroxylation of mono-unsaturated fatty materials with hydrogen peroxide," in the Journal of the American Chemical Society, volume 67, page 1786 (1945). This particular article is concerned with the hydroxylation of long chained aliphatic compounds, such as oleic acid, elaidic, hendecenoic acids, and methyl ricinoleate. The reactions involved using hydrogen peroxide and either formic or acetic acid, may be indicated in the following manner:

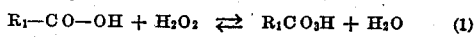

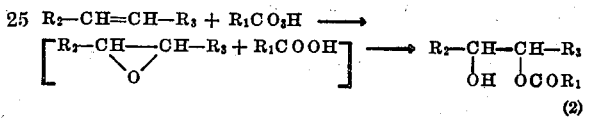

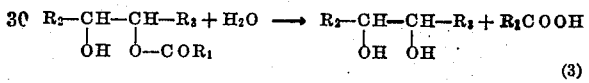

This particular article includes data as to saponification or neutralization values, iodine values, etc. Apparently, no data is included as to hydroxyl value or acetyl value of the final resultants.

Whatever the simplicity of the reaction may be as far as mono-unsaturated glycerides or esters are concerned, such as for example oleic acid, methyl ricinoleate, etc., it is obvious that when the glycerides or the acids of polyene acids, such as fish oil acids, sardine oil acids, linseed oil acids, etc. are subjected to the same hydroxylation procedure, that other factors and possibly other reactions are involved. This is obvious by applying the procedure to a number of reactants, some of which are mono-unsaturated and some of which contain more than one unsaturated bond. If the results after treatment are measured not only by a decrease in iodine number but also by increase in hydroxyl number, it is obvious that reactions of a more complex nature are probably involved. A brief tabular outline of a variety of experiments intended to show the nature of the reaction and the difference of the simplicity of the reaction between mono-unsaturated reactants and poly-unsaturated reactants, is herein included:

| | Oil | Acid No. | Sap'n No. | Hydroxyl No. | Iodine No. |
|---|---|---|---|---|---|
| | BEFORE TREATMENT | | | | |
| 1 | Oleic acid U. S. P | 195.50 | 195.5 | 0.0 | 86.8 |
| 2 | Methyl Ricinoleate Baker's P-1 | 10.70 | 178.0 | 157.5 | 82.0 |
| 3 | Castor Oil Baker | 9.20 | 178.4 | 154.5 | 82.95 |
| 4 | Raw Linseed Oil Spencer Kellog | 6.18 | 187.6 | None | 164.2 |
| 5 | Crude Sardine Oil | 7.56 | 189.0 | None | 165.4 |
| 6 | ----do---- | 7.56 | 189.0 | None | 165.4 |
| 7 | Crude Sardine Oil Water-Insol. Fatty Acids. 92% of Orig. Oil. (By Alkaline Sap.) | 195.40 | 199.5 | None | 188.0 |
| 8 | Dist. Tallol Indus. Chem. Sales | 180.00 | 180.0 | 24.2 | 109.5 |
| 9 | Cardanol Vac. Dist. #5923 Irv. Varn. & Ins. Co | 11.20 | 11.63 | 196.0 | [1] 238.5 |
| 10 | Methyl Ricinoleate Baker's P-1 | 10.70 | 178.0 | 157.5 | 82.0 |
| 11 | Castor Oil, Baker | 9.20 | 178.4 | 154.5 | 82.95 |
| 12 | Dist. Tallol Indus. Chem. Sales | 180.00 | 180.0 | 24.2 | 109.5 |
| 13 | Crude Sardine Oil | 7.56 | 189.0 | None | 165.4 |

[1] Calc. 88.0.

| | Oil | Percent Yield [1] of water Insol. OH Acids | Acid No. | Sap'n No. | Hydro No. | Iod. No. | Percent Decrease in Iod. No.[2] | Percent Increase in OH No.[3] | Remarks |
|---|---|---|---|---|---|---|---|---|---|
| | AFTER FORMIC ACID H₂O₂ TREATMENT | | | | | | | | |
| 1 | Oleic Acid U. S. P | 115.0 | 181.0 | 182.50 | 286.0 | 3.00 | 96.55 | 77.5 | H₂O₂ to sat. all dbl. bonds plus sl. excess. |
| 2 | Methyl Ricinoleate Baker's P-1 | 107.0 | 172.0 | 172.20 | 436.0 | 2.13 | 97.40 | 89.0 | Do. |
| 3 | Castor Oil Baker | 97.5 | 170.7 | 172.00 | 435.0 | 2.00 | 97.60 | 89.5 | Do. |
| 4 | Raw Linseed Oil Spencer Kellog | 74.3 | 172.6 | 174.90 | 316.0 | 8.8 | 94.80 | 51.5 | Do. |
| 5 | Crude Sardine Oil | 67.0 | 181.5 | 193.75 | 172.8 | 5.27 | 96.80 | 26.9 | Do. |
| 6 | ----do---- | 84.0 | 179.5 | 187.70 | 152.0 | 77.3 | 53.25 | 44.6 | H₂O₂ to sat. ½ of dbl. bonds. |
| 7 | Crude Sardine Oil Water-Insol. Fatty Acids 92% of Orig. Oil (By Alkaline Sap.). | 67.5 | 183.9 | 188.50 | 187.4 | 7.2 | 96.20 | 30.3 | H₂O₂ to sat. all of dbl. bonds plus sl. excess. |
| 8 | Dist. Tallol Indus. Chem. Sales | 102.0 | 182.6 | 182.80 | 152.7 | 52.3 | 52.50 | 60.3 | Do. |
| 9 | Cardanol Vac. Dist. #5923 Irv. Varn. & Ins. Co. | 98.6 | 12.8 | 19.20 | 280.35 | 173.25 | 27.30 | 92.0 | H₂O₂ to sat. only 1 dbl. bond, i. e., 88 iod. No. |
| | AFTER ACETIC ACID—H₂O₂—H₂SO₄ TREATMENT | | | | | | | | |
| 10 | Methyl ricinoleate | 79.0 | 166.0 | 162.0 | 348.5 | 5.18 | 93.70 | 75.2 | H₂O₂ to sat. all dbl. bond sl. excess. |
| 11 | Castor Oil, Baker | 98.6 | 169.1 | 172.50 | 366.8 | 4.60 | 94.50 | 78.1 | Do. |
| 12 | Dist. Tallol Indus. Chem. Sales | 104.5 | 173.5 | 197.00 | 84.3 | 52.8 | 51.7 | 34.2 | (H₂O₂ to sat. all dbl. bonds—1 mole acetic acid instead of usual 13½ moles hydrolyzed with H₂O) |
| 13 | Crude Sardine Oil | 87.8 | 76.15 | 186.25 | 132.6 | 96.7 | 41.5 | 80.2 | H₂O₂ to sat. ½ dbl. bonds. |

[1] The percent yield means weight of the formoxy or acetoxy compound, divided by the weight of the original oil.
[2] Percent decrease in iodine No.—Iodine No. on oil before treatment minus Iodine No. on oil after treatment, divided by Iodine No. on oil before treatment.
[3] Percent increase in hydroxyl No.—Max. possible hydroxyl No. as calculated from hydroxyl. No. of oil before treatment and drop in iodine No. after treatment, divided into observed hydroxyl No. after treatment.

It can readily be seen, from the tabular outline that in no case, at least as far as polyene reactants are concerned, was quantitative hydroxylation obtained. The nearest approach to quantitative hydroxylation was obtained from methyl ricinoleate on the one hand, and castor oil on the other hand. In both instances, hydroxylation was approximately 86.5 to 87.5%. Possibly, the fact that quantitative hydroxylation was not obtained in even these two instances is explained by the presence of diene acids in combined form in these esters.

When the diene oils and acids were treated, the percentage of hydroxylation was very low. This was particularly noticeable where enough hydrogen peroxide was employed to saturate all double bonds. Reference to the table shows that hydroxylation under such instances may approximate 26.5% or thereabouts. The percentage of fatty acids is also very low, i. e., 67 to 85% of the original oil. This fact, taken in consideration with the low percentage of hydroxylation, suggests the possibility of some other reaction; possibly, a side reaction suggestive of polymerization of resin formation.

In the case of Cardanol, the increase in the hydroxyl value was 92% of that possible for a 27% reduction of the iodine value (which is all that was obtained although the amount of hydrogen peroxide used was sufficient to have given a 36.8% reduction.)

The results on the hydroxylation experiment of 310 g. of tallol (line 12 of table) using 1 mole (the minimum quantity) of acetic acid and enough H₂O₂ to saturate the double bonds, show that the acetoxy derivative may be readily hydrolyzed in 6 hours, by heating with water at 85° C. and agitating.

The results of the hydroxylation experiment of 300 grams of sardine oil (line 13 of table) using acetic acid H₂SO₄ and peroxide as in the case of tallol show that a product having constants very similar to a mixture of 40% ricinoleic acid and 60% castor oil were obtained. The fact that the material is an oil at room temperature and not a solid as the material whose constants are given on line 6 of table, is due to the method of hydrolysis (heating with water). This method broke up the acetoxy compound completely but only removed about 40% of the glycerine, whereas alkaline saponification would have removed all of the glycerine as well as the acetoxy compound. This accounts for a yield of 87.4% instead of 84%.

In light of the data previously presented, it is apparent that the same procedures can be followed on any suitable scale in order to obtain the polyhydroxylation of polyene acids or glycerides. The following examples are included for purpose of additional illustration.

PARTIALLY HYDROXYLATED OIL

Example 1

3000 grams of sardine oil was treated with approximately 3000 grams of 90 per cent formic acid (approximately 6 moles) and 1500 grams of 27 per cent peroxide in a reaction vessel which was glass lined throughout, including the stirrer. Formic acid was first added as quickly as possible. The peroxide was then added slowly so as to maintain the temperature of reaction at approximately 40° C. This temperature was maintained purely by the exothermic heat of reaction. The time required to add the peroxide varied with different batches. It was roughly 2¾ to 3½ hours. After all the peroxide was added, external heat was used if necessary to maintain the temperature at 40° C. for another three hours with constant stirring.

The reaction mass was allowed to stand overnight and showed separation. Two volumes of water were added to the reaction mass and agitated vigorously at 85° C. so as to produce hydrolysis. The oil layer was separated and the aqueous layer either discarded or saved for recovery of the acid. It is to be noted that hydrolysis is conducted so as to break out the formoxy or acetoxy radicals but not to necessarily convert the glyceride into the free acids to any greater degree than is necessary. Actually, it is probable that not much more than 10 or 15 per cent of the glyceride was necessarily converted into the free monomeric acid. This is indicated by the analysis of the partially hydroxylated glyceride or oil recovery. The material itself is a clear yellow oil in appearance, similar to castor oil, and has the following constants:

| | |
|---|---|
| Acid value | 27.65 |
| Saponification value | 232.5 |
| Iodine value | 85.7 |
| Hydroxyl value | 183.25 |

PARTIALLY HYDROXYLATED OIL

Example 2

The same procedure was employed as in Example 1 preceding, except that tallol is substituted for sardine oil. The purified tallol employed consisted roughly of 60 per cent oleic acid, 30 per cent abietic acid, and 10 per cent stearols and nonsaponifiables. The effect of the reaction on abietic acid is obvious, but in the bulk the hydroxylation seemed to affect the oleic acid only. In the particular experiment, the ratios were changed slightly as follows: 3100 grams of tallol were reacted with 745 grams of 90 per cent formic acid (1½ moles) and 1125 grams of 27 per cent hydrogen peroxide. Otherwise the conditions were identical with Example 1 preceding. The product obtained was somewhat darker than in the preceding example and had the following constants:

| | |
|---|---|
| Acid value | 165.0 |
| Saponification value | 186.1 |
| Hydroxyl value | 111.5 |
| Iodine value | 81.3 |

PARTIALLY HYDROXYLATED OIL

Example 3

Raw linseed oil was substituted for sardine oil in Example 1 preceding. The conditions employed were identical with those described in Example 1 preceding. The ratios of reactants were as follows: Raw linseed oil 2820 grams, 90 per cent formic acid 16,920 grams, hydrogen peroxide 27 per cent 1080 grams. The resultant products varied somewhat with various batches, but in general usually gave values corresponding closely to those indicated in the table. For instance, acid and saponification value approximately 175, hydroxyl value approximately 300, iodine value approximately 10. It will be noted that in this particular experiment there was substantial hydrolysis of the glyceride as indicated by the fact that the saponification value and acid value were about the same. It will be noted that the residual iodine value was comparatively low. Actually the present procedure although applicable to linseed oil or other comparable oils, appears to be better adapted to glycerides and acids having an even higher initial iodine value, such as marine oils, fish oils, and the like.

PARTIALLY HYDROXYLATED OIL

Example 4

A menhaden oil very similar in constants with the sardine oil employed in Example No. 1, was treated in an identical manner. Although the menhaden oil had a somewhat higher iodine value than the sardine oil, for instance approximately 190 compared with 180 for the sardine oil, the entire procedure was conducted in the same way as described in Example 1 and the final product had constants substantially the same as indicated for sardine oil.

PARTIALLY HYDROXYLATED OIL

Example 5

A marine liver oil, such as codliver oil or sardine liver oil obtained after vitamin extraction, was employed in the same manner as described in the preceding examples, particularly Example 1. Such residual oils have an iodine value of approximately 150 to 190. In many cases their cost is low and they are particularly attractive for this reason.

Having obtained partially hydroxylated unsaturated oils of the kind previously described and exemplified in Examples 1 to 5 immediately preceding, the next step is to subject such products to drastic oxidation, much in the same way that is employed in producing blown castor oil, blown soyabean oil, blown neatsfoot oils, etc. It is well known that oxidized oils can be obtained from castor oil, ricinoleic acid and various derivatives of ricinoleic acid, such as monoricinolein, diricinolein, and polyricinoleic acids. They are produced by the common practice of blowing or oxidizing castor oil and similar fatty oils or acids, particularly non-drying unsaturated fatty oils, by means of a gaseous medium, such as air, oxygen, ozone or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc., or it may be of the organic type which produces peroxide, such as alpha-pinene, linseed oil, etc. Oxidation may take place at atmospheric pressure or super atmospheric pressure, i. e., pressures up to or including 200 pounds gauge pressure, and at any temperature slightly above the boiling point of water, for instance 120° C. up to any temperature which does not produce undue decomposition by pyrolytic reaction.

The time of blowing may be fairly brief, for example, 8–10 hours; or it may be quite extensive, for instance as long as 10–12–14 days, the longer time periods being employed generally when the temperature is just slightly above the boiling point of water, and when oxidation is with air at atmospheric pressure.

One method of preparing drastically-oxidized castor oil is described in U. S. Patent No. 2,023,979, dated December 10, 1935, to Stehr. Also see U. S. Patent No. 2,183,487, dated December 12, 1939, to Colbeth.

In light of what has been said previously, it hardly seems necessary to include any examples of the drastically oxidized product which serves as an intermediate in so far that it is next subjected to oxyalkylation. However, as a matter of convenience, this particular step in the invention may be illustrated by the following examples.

DRASTICALLY OXIDIZED, PARTIALLY HYDROXYLATED OIL

*Example 1*

A partially hydroxylated sardine oil of the kind characterized by Example 1 preceding, is subjected to gaseous oxidation with air for approximately 600 hours. The temperature employed was approximately 100° C. During this period there was a very decided increase in viscosity and the oxidation was stopped just short of the rubbery or stringy stage. The particular sample employed, prior to oxidation, had the following constants:

| | |
|---|---|
| Acid value | 19.1 |
| Saponification value | 222.5 |
| Hydroxyl value | 171.1 |
| Iodine value | 86.2 |

After oxidation in which there was a decided change as indicated by increased viscosity and reduced solubility in the usual solvents, such as aromatic solvents, etc., there was comparatively little change in the chemical constants with the exception of the iodine value. The acid value increased to 28.3. The saponification value showed little change as indicated by a value of 225. There was a comparatively slight increase in hydroxyl value to 177.0. There was a distinct drop in the iodine value to 69.9.

However, as in the case of castor oil, it has long been recognized that it is difficult to determine the changes which take place during drastic oxidation, and even in the case of castor oil where the procedure is well known, the chemical constants as such are not a complete index as to what has taken place. This same situation appears to apply in the instant case in connection with the oils herein subjected to drastic oxidation.

DRASTICALLY OXIDIZED, PARTIALLY HYDROXYLATED OIL

*Example 2*

The same procedure is employed as in Example 1 immediately preceding, except that the product subjected to drastic oxidation is a derivative of menhaden oil as described in Partially Hydroxylated Oil, Example 4.

DRASTICALLY OXIDIZED, PARTIALLY HYDROXYLATED OIL

*Example 3*

The same procedure is employed as in Example 1 immediately preceding, except that the product subjected to drastic oxidation is sardine liver oil obtained after vitamin extraction as described under Partially Hydroxylated Oil, Example 5.

Previous reference has been made to U. S. Patent 2,307,494, dated January 5, 1943, to De Groote and Keiser. This particular patent describes the oxyalkylation, particularly the oxyethylation, of blown castor oils. Procedures herein employed for the oxyalkylation of the drastically oxidized partially hydroxylated oils are substantially identical with the procedure described in the aforementioned U. S. Patent 2,307,494. The following is an excerpt of the description of oxyalkylation as it appears in said patent:

"It is well known that if triricinolein, preferably in the form of castor oil, is treated with an oxyalkylating agent, particularly ethylene oxide, propylene oxide, butylene oxide, glycidol or the like, and if one employs a large molecular proportion of the oxyalkylating agent for each mole or occurrence of the ricinoleyl radical, that one can convert castor oil into a water soluble product. The conventional procedure is well known, and generally speaking, involves nothing more or less than heating castor oil in the presence of successive small amounts of alkylene oxide or the like, under comparatively low pressures and fairly low temperatures, and usually in the presence of an alkylene catalyst, as, for example, sodium ricinoleate. The temperatures employed are generally above 100° C. and below 200° C. The pressures employed are generally above 100 lbs. gauge and below 300 lbs. gauge pressure. Sometimes oxyalkylation is conducted in a continuous manner by introduction of the ethylene oxide in a gaseous state. More frequently, and most conveniently, the oxide is introduced in a liquid form in a comparatively small amount, for instance, 300 pounds of castor oil and 30 pounds of ethylene oxide, along with approximately one pound of sodium ricinoleate. Reaction is allowed to take place under pressure in the manner above described until all the ethylene oxide is added, and the procedure repeated until water solubility is obtained. Not infrequently as many as 30 pound moles of the oxyalkylating agent are employed for one pound mole of triricinolein, in order to obtain complete water solubility. Needless to say, ethylene oxide promotes solubility in lower molecular proportions than propylene oxide or butylene oxide. Furthermore, ethylene oxide is preferable, due to its greater reactivity.

"In the manufacture of such oxyalkylated blown castor oils we prefer, for the sake of convenience to consider the molecular weight of the blown castor oil the same as if it were unmodified triricinolein. This is not strictly correct, but it is convenient, thus subsequent reference to one pound mole of blown castor oil is intended to mean 944 pounds. Our preference is to treat one pound mole of castor oil with approximately three, six or nine moles of ethylene oxide. Drastic oxyethylation may introduce as many as 18 or 20 moles of ethylene oxide, without yielding a water-soluble product. In the event propylene oxide or butylene oxide is employed, a greater molar ratio of the alkylene oxide can be employed, but greater difficulty is incurred because such reactants combine less readily than ethylene oxide."

The oxyalkylation, particularly the oxyethylation, of the previously described drastically oxidized products, is conducted in the same manner employed for the oxyethylation of blown castor oil, with the exception that the herein described products generally oxyethylate to distinctly hydrophile or water-soluble properties with the addition of some less ethylene oxide or oxyalkylating agent than is required in the case of blown castor oil. The following examples will serve to illustrate this procedure:

OXYALKYLATED, DRASTICALLY OXIDIZED, PARTIALLY HYDROXYLATED OIL

*Example 1*

1700 pounds of drastically oxidized partially hydroxylated oil obtained from sardine oil and exemplified by Example 1 preceding, is mixed with 40 pounds of sodium methylate. The material is placed in a reaction vessel and heated to approximately 110 to 115° C. Approximately 500 pounds of ethylene oxide are added over a period of 7 hours with a pressure within the range of 120 to 140 pounds. At the end of this period the pressure dropped, showing that the first step in the oxyethylation was complete. Another 30 pounds of sodium methylate was then added and the procedure repeated using an additional 500 pounds of ethylene oxide. The second oxyethylation was completed in 4 hours using a maximum temperature of 150 degrees centigrade and the same pressure as before. This particular product in which the ethylene oxide added was equivalent to approximately 60 per cent. by weight, of the original drastically oxidized compound, was less viscous than before treatment and comparatively water soluble. In fact, it appeared to be more water soluble than in instances where considerably more ethylene oxide had been added to a drastically oxidized castor oil.

If this water soluble product was given one more treatment under the same conditions as the second treatment but without added catalyst so as to combine 1500 pounds of ethylene oxide with the original 1700 pounds of drastically oxidized oil, then the final product so obtained was extremely water soluble and decidedly less viscous than the original material. The original material prior to oxyethylation, is dark amber in color whereas the oxyethylated product had a light honey color.

OXYALKYLATED, DRASTICALLY OXIDIZED, PARTIALLY HYDROXYLATED OIL

*Example 2*

The same procedure is followed as in Example 1 preceding, except that the drastically oxidized product subjected to oxyalkylation is menhaden oil and described under the heading Drastically Oxidized Partially Hydroxylated Oil, Example 2.

OXYALKYLATED, DRASTICALLY OXIDIZED, PARTIALLY HYDROXYLATED OIL

*Example 3*

The same procedure is followed as in Example 1 preceding, except that the product employed is a derivative of sardine oil as described under the heading Drastically Oxidized Partially Hydroxylated Oil, Example 3.

OXYALKYLATED, DRASTICALLY OXIDIZED, PARTIALLY HYDROXYLATED OIL

*Example 4*

The same procedure is followed as in Examples 1 to 3 immediately preceding, except that stoichiometric equivalents of propylene oxide are employed to replace the ethylene oxide.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials herein described may be admixed with one or more of the solvents customarily used in connection with conventional demulsifying agents, provided that such compounds are compatible. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our improved process for resolving petroleum emulsions of the water-in-oil type, a treating agent or demulsifying agent of the kind above described, is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is used in connection with acidification of calcareous oil-bearing strata, especially if suspended in or dissolved in the acid employed for acidification.

The new chemical products or compounds herein described form the subject-matter of our divisional application Serial No. 1,484, filed January 9, 1948.

Having thus described our invention, what we claim and desire to secure by Letters Patent is:

1. A process for breaking petroleum emulsions of the water-in-oil type, characterized by subjecting the emulsion to the action of a demulsifying agent comprising a product consisting of an oxyalkylated, drastically oxidized, partially hydroxylated member of the class consisting of polyethylenic acids and their glycerides; said partial hydroxylation being by agency of hydrogen peroxide; said oxyalkylation being by agency of an alkylene oxide having not over 4 carbon atoms, and said drastic oxidation being by agency of a gaseous oxygen containing medium.

2. The process of claim 1 wherein said product is a marine oil derivative.

3. The process of claim 1 wherein said product is a sardine oil derivative.

4. The process of claim 1 wherein said product is a menhaden oil derivative.

5. The process of claim 1 wherein said product is a sardine liver oil derivative.

MELVIN DE GROOTE.
BERNHARD KEISER.

REFERENCES CITED

The following references are of record in the file of this patent:

UNITED STATES PATENTS

| Number | Name | Date |
|---|---|---|
| 1,949,028 | Schwarcman | Feb. 27, 1934 |
| 2,256,353 | Rheineck et al. | Sept. 16, 1941 |
| 2,267,248 | Milas | Dec. 23, 1941 |
| 2,285,059 | Scanlan et al. | June 2, 1942 |
| 2,307,494 | De Groote et al. | Jan. 5, 1943 |
| 2,340,355 | Wirtel | Feb. 1, 1944 |
| 2,367,050 | Price | Jan. 9, 1945 |
| 2,375,538 | De Groote | May 8, 1945 |